United States Patent [19]

Brügmann

[11] Patent Number: 4,994,680

[45] Date of Patent: Feb. 19, 1991

[54] PHOTOELECTRIC MEASUREMENT HEAD FOR MONITORING A PLASTIC EXTRUDED SECTION

[75] Inventor: Dirk Brügmann, Schwerte, Fed. Rep. of Germany

[73] Assignee: Kunststoff-Verarbeitung GmbH Dirk A. Brügmann, Fed. Rep. of Germany

[21] Appl. No.: 518,659

[22] Filed: May 3, 1990

[30] Foreign Application Priority Data

Jun. 29, 1989 [DE] Fed. Rep. of Germany ....... 3921402

[51] Int. Cl.$^5$ ............................................. G01N 21/86
[52] U.S. Cl. ................................ 250/561; 250/227.11; 250/238
[58] Field of Search ................... 250/560, 561, 227.11, 250/238; 356/376, 386, 387

[56] References Cited

U.S. PATENT DOCUMENTS 4,564,765  1/1986  Blaich ................................. 250/561
4,716,942  1/1988  Jensen et al. ....................... 250/561

*Primary Examiner*—David C. Nelms
*Assistant Examiner*—K. Shami
*Attorney, Agent, or Firm*—Anthony C. Casella; Gerald E. Hespos

[57] ABSTRACT

A photoelectric measurement head (26) for the monitoring of the cross-section of a profiled section between an extruder and a calibrating device of an extrusion press for the manufacture of plastic profiled sections (24) is provided in the region of a free head end of the measurement-head housing (30) with two light-passage openings (38, 42) for a light outlet and light inlet respectively. The light passage openings are arranged on opposite sides of a passage (40) for the profiled section. In each opening (38, 42) a light-transmitting glass cover (64, 66) is inserted. Furthermore, two heating elements (60, 62) are inserted in the measurement-head housing (30) in the region of its free head end in the direct vicinity of the glass covers (64) and (66). The heating elements are connected to a temperature-setting device which maintains the temperature of the free head end of the measurement-head housing at the temperature of the profiled section (24) at the nozzle outlet of the extruder.

7 Claims, 2 Drawing Sheets

PHOTOELECTRIC MEASUREMENT HEAD FOR MONITORING A PLASTIC EXTRUDED SECTION

FIELD OF THE INvENTION

The present invention relates to a photoelectric measurement head for monitoring the cross-section of a profiled section between extruder and calibrating device of an extrusion press for the manufacture of plastic profiled sections which is provided in the region of a free head end of the measurement-head housing with two light-passage openings for the emergence and entrance of light, respectively, which are arranged on opposite sides of a passage for the profiled-section, and each of which has a light-transmitting glass covering.

BACKGROUND OF THE INVENTION

Such a photoelectric measurement head is frequently used for determining a proportional change in a profiled section in front of a calibrating device, directly after the profiled section has left the extruder nozzle. Other uses of this measurement head in the region between extruder nozzle and calibrating device are conceivable, for instance the monitoring of the collection of dust. Such a measurement head is described in Federal Republic of Germany No. OS 32 34 126 and European Patent No. OS 0 164 029.

In the vicinity of the outlet opening of the extruder nozzle, temperatures between about 160° C. and 300° C. generally prevail, while in the region of the inlet openings to the calibrating device temperatures of between about +15° C. and +30° C. and, in the case of a few types of plastics, up to +80° C. customarily prevail.

Furthermore the distance between the outlet opening of the extruder outlet nozzle and the inlet opening to the calibrating device is very slight, so that the measurement-head body must be designed with due regard of the high temperatures in the region of the outlet opening of the extruder nozzle, i.e. it must consist of suitable temperature-resistant materials. For this reason the light-transmitting coverings necessarily consist of glass.

In actual practice, problems frequently arise with measurement heads of this type since the outer surfaces of the glass coverings tend toward fogging. Further examinations in connection with measurement errors of the measurement head which surprisingly occur have shown that additives such as plasticizer and lubricants which are added to the material of the plastic profiled section and which tend to vaporize at the prevailing temperatures will deposit on the surfaces of the glass coverings. These deposits on the surfaces of the coverings affect the passage of light so that the measurement results of the measurement head become erroneous.

The object of the present invention is so to develop a photoelectric measurement head of the aforementioned type that the problem of the precipitation of volatile additives to the material of the plastic profiled section on the glass coverings is avoided in a simple manner.

SUMMARY OF THE INVENTION

In accordance with the invention, a photoelectric measurement head of the aforementioned type is characterized for this purpose by an electric heating system having a temperature adjustment means which maintains the temperature of at least the free head end of the measurement-head housing at the temperature of the profiled section at the outlet from the extruder nozzle.

The heating arrangement preferably comprises a separate heating element for each light-transmitting glass covering, said elements being arranged in the measurement-head housing in the vicinity of the associated glass covers and being preferably cast together there, in heat-conductive manner, with heat-conducting parts of the housing.

In a measurement head of the invention it is assured that the two light-transmitting glass coverings have, in operation, a temperature of the material of the plastic profiled section within the region of its emergence from the extruder nozzle. In this way, precipitation of the volatile additives of the plastic profiled section of the glass coverings is avoided in simple fashion since they cannot condense there due to the high temperature of the coverings.

BRIEF DESCRIPTION OF THE DRAWINGS

Embodiments of the invention will be explained with reference to the drawing, in which.

DETAILED DESCRIPTION OF THE PREFERRED EMBODIMENTS

Figure 1:
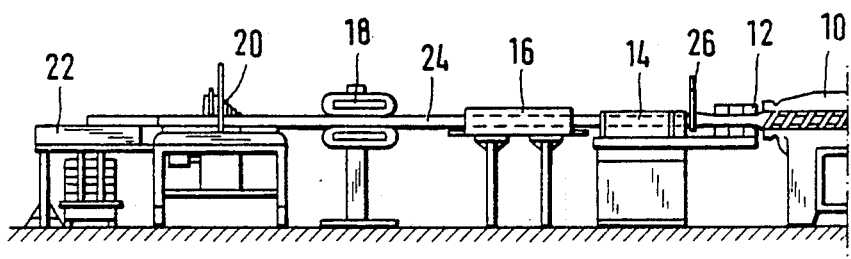
FIG. 1 shows an embodiment of an extruder for the manufacture of plastic profiled sections.

The installation shown in FIG. 1 for the production of plastic profiled sections consists of a worm extruder 10, a nozzle 12, a calibrating device 14, a cooling path 16, a withdrawal means 18, a cut-off saw 20, as well as a stacking device 22. For the production of the profiled section, the plastic material is fed by the worm extruder !0 through the nozzle 12 to the calibrating device 14. In the following cooling path 16, the plastic profiled section 24 is cooled by water to such an extent that thermoelastic deformation is no longer possible. After passing through the removal device 18, the profiled section arrives at the automatic cutoff saw 20, whereupon the profiled sections are stacked in the stacking device 22 and prepared for transportation.

Figure 2:
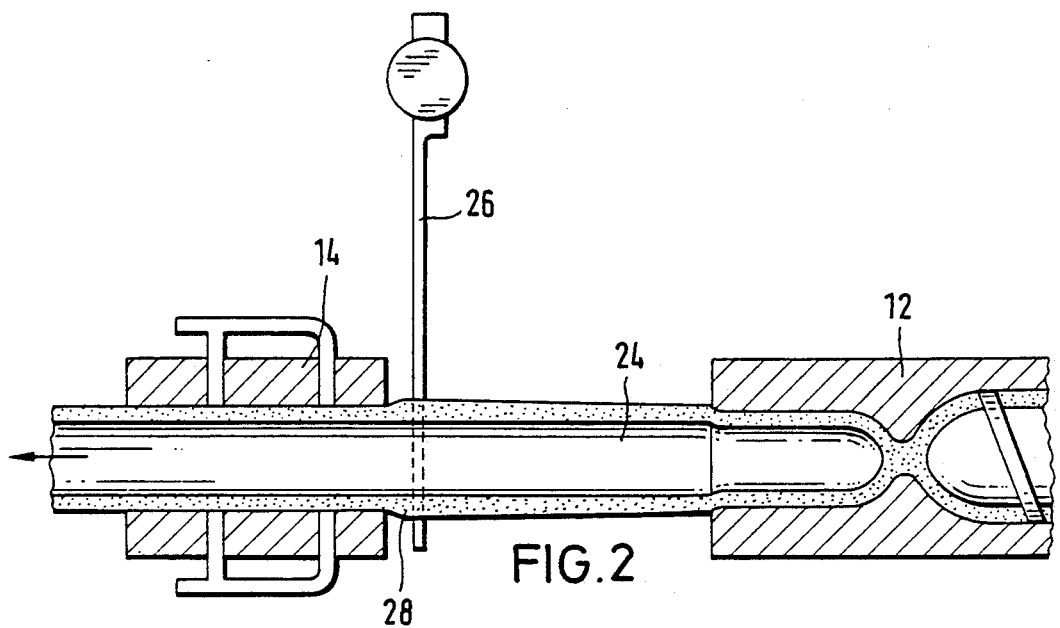
FIG. 2 shows, on a larger scale, the outlet end of an extruder nozzle and the entrance end of a calibrating device.

Between the nozzle 12 and the calibrating device 14, a measurement head 26 is provided for determining a proportional change in a profiled section, for instance by the building up of an accumulation. As can be noted from FIG. 2, the measurement head 26 is arranged directly in front of the entrance end of the calibrating device 14.

Figure 3:
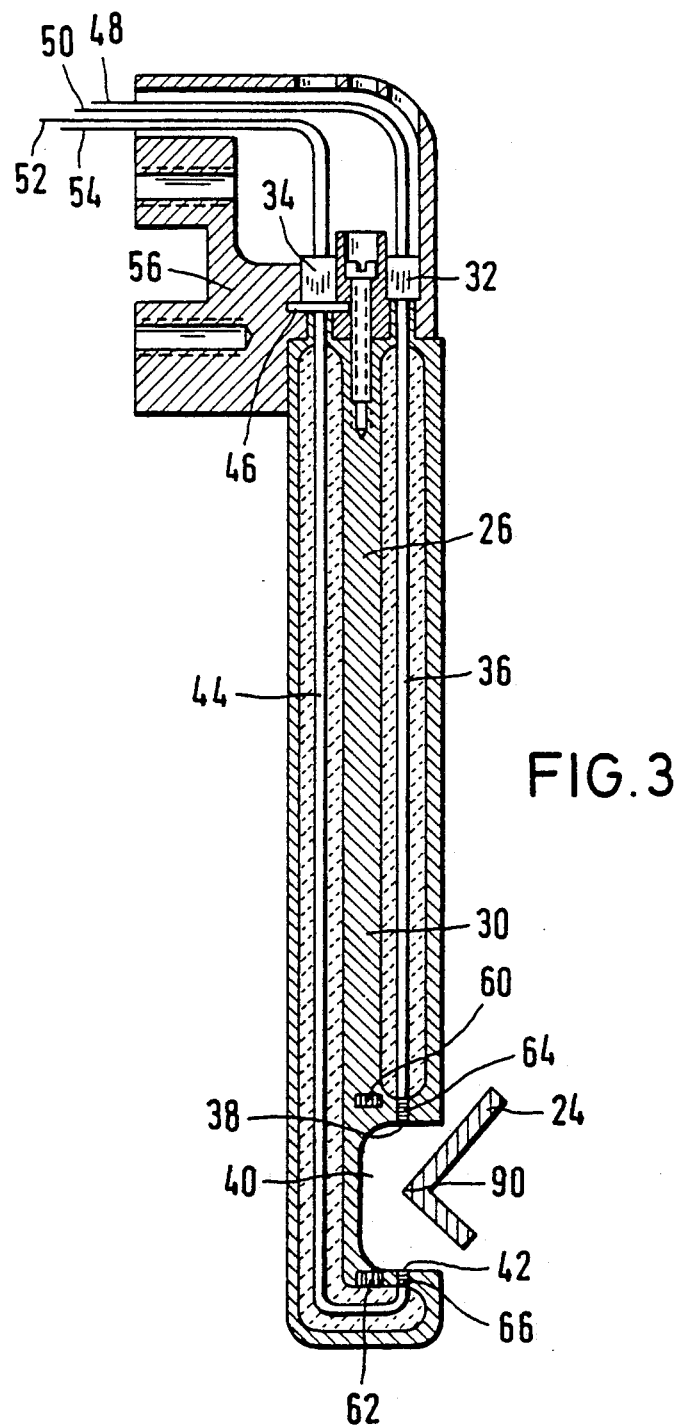
FIG. 3 is a side view of a measurement head.

As can be noted in particular from FIG. 3, the measurement head 26 consists of a housing 30 within which a light transmitter 32 and a light-sensitive receiver 34 are arranged. Luminous energy is given off by the transmitter 32 via light-guide fibers 36 to a light outlet opening 38. The housing 30 is developed with a passage 40 for the profiled section so that the measurement head 26 can grip around the plastic profiled section 24. Opposite the outlet opening 38 there is a light entrance opening 42 to light-guide fibers 44 which are conducted to the receiver 34.

FIG. 3 furthermore shows a filter 46 which permits only light of given wavelengths to pass, connections 48, 50 for the transmitter 32, lines 52, 54 for the receiver 34, and an attachment section 56 for guide pins and a corner 90 of the profiled section 24.

Figure 4:
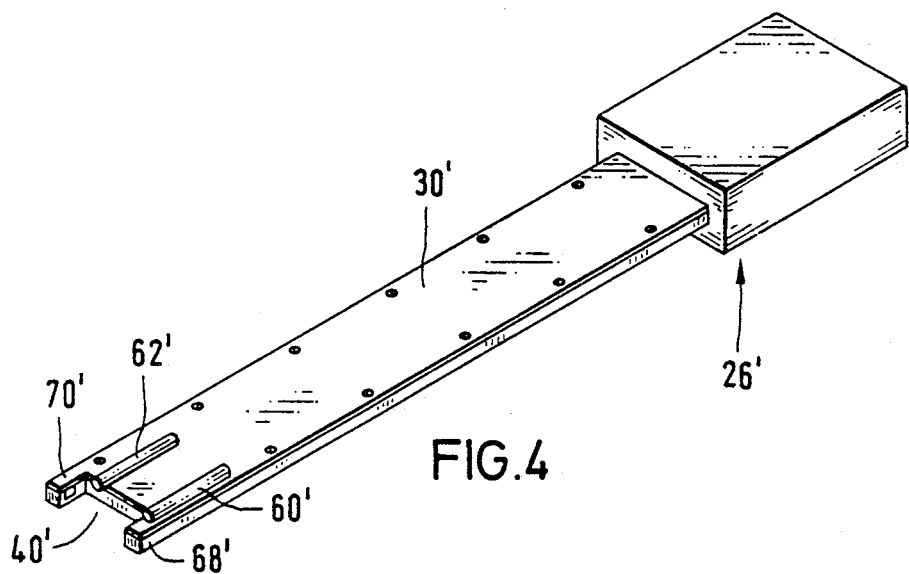
FIG. 4 is a diagrammatic perspective view of another embodiment of a measurement head.

The light-guide fibers 36 and 44 have a diameter within the millimeter range so that the housing 30 of the measurement head 26 can be very thin, as can be noted, for instance, from FIG. 4.

Furthermore, in the embodiment shown in FIG. 3, light-transmitting coverings 64 and 66 of glass are arranged both in the light outlet opening 38 and on the light entrance opening 42, respectively, these coverings protecting the end of the associated light-guide fibers.

Furthermore, FIG. 3 diagrammatically shows heating elements 60, 62 arranged in the vicinity of each covering 64 and 66, respectively. The heating elements 60 and 62 are inserted into the housing 30 and are advantageously cast into a unit with heat-conducting parts of the housing so as to optimize the heat transfer.

The heating elements 60 and 62 are connected by wires (not sown) to a temperature-setting device (not shown).

FIG. 4 shows diagrammatically another embodiment of a measurement head 26' in which the passage 40' for the profiled-section, developed on the free end of the measurement-head body 30' is limited on each of two opposite sides by extending fingers 68' and 70', respectively, of the measurement-head housing 30'. In each finger 68' and 70' there is developed a light-passage opening, these openings lying opposite each other. Only one of the light-passage openings is shown diagrammatically in the finger 70'. The measurement-head housing 30' itself is developed as a very flat bar. Furthermore, each of the light-passage openings (not provided with numbers) in the fingers 68' and 70' is provided with a cover of glass. Two heating elements, 60' and 62' are inserted into the flat measurement-head housing 30', for instance cast together with parts of the body. Each of the heating elements 60', 62' is arranged in the vicinity of one of the fingers 68' and 70', respectively, and placed as close to the associated light-passage opening as permitted by the channels for the light-guide fibers. The heating elements 60' and 62' are, in their turn, connected to a temperature-setting device (not shown in the drawing) by connecting wires also not shown in the drawing.

I claim:

1. A photoelectric measurement head for monitoring a cross-section of a profiled section between an outlet of an extruder (10, 12) and calibrating device (14) of an extrusion press for manufacturing plastic profiled sections (24), which is provided, within a region of a free head end of a measurement-head housing (30) with two light-passage openings (38, 42) for emergence and entrance of light, respectively, which are arranged on opposite sides of a passage (40) for the profiled section, each of which openings has a light-transmitting glass cover (64, 66), characterized by an electric heating arrangement (60, 62; 60', 62') having a temperature-adjusting means which maintains a temperature at least of the free head end of the measurement-head housing (30) at the temperature of the profiled section (24) at the outlet of the extruder.

2. A measurement head according to claim 1, characterized by the fact that the heating arrangement has at least one heating element (60, 62; 60', 62') which is arranged on the measurement-head housing (30) in the vicinity of the glass coverings (64, 66) of the light passage openings (38, 42).

3. A measurement head according to claim 2, characterized by the fact that one heating element each (60, 62; 60', 62') is arranged in the vicinity of each glass cover (64, 66) of the light-passage openings (38, 40).

4. A measurement head according to claim 2, characterized by the fact that the heating elements (60, 62; 60', 62') are inserted into the measurement-head housing (30).

5. A measurement head according to claim 4, characterized by the fact that the heating elements (60, 62; 60', 62') are cast, in heat-conductive manner, together with heat-conducting parts of the measurement-head housing (30).

6. A measurement head according to claim 3, characterized by the fact that the heating elements (60, 62; 60', 62') are inserted into the measurement-head housing (30).

7. A measurement head according to claim 6, characterized by the fact that the heating elements (60, 62; 60', 62') are cast, in heat-conductive manner, together with heat-conducting parts of the measurement-head housing (30).

* * * * *